United States Patent [19]

Wnenchak

[11] Patent Number: 5,104,727
[45] Date of Patent: Apr. 14, 1992

[54] AIR BAG LAMINATES

[75] Inventor: Raymond Wnenchak, Newark, Del.

[73] Assignee: W. L. Gore & Associates, Inc., Newark, Del.

[21] Appl. No.: 537,184

[22] Filed: Jun. 12, 1990

Related U.S. Application Data

[63] Continuation-in-part of Ser. No. 461,193, Jan. 5, 1990, abandoned, which is a continuation-in-part of Ser. No. 367,401, Jun. 16, 1989, abandoned.

[51] Int. Cl.⁵ .............................................. B32B 15/00
[52] U.S. Cl. ..................................... 428/285; 428/198;
428/251; 428/252; 428/280; 428/282; 428/284;
428/287; 428/315.5; 428/315.9; 428/421;
428/422; 428/902; 428/903
[58] Field of Search ............... 428/251, 252, 267, 282,
428/284, 285, 287, 315.5, 315.9, 902, 903, 198,
421, 422

[56] References Cited

U.S. PATENT DOCUMENTS

| | | | |
|---|---|---|---|
| 3,799,574 | 3/1974 | Bonn et al. | 280/150 AB |
| 3,807,754 | 4/1974 | Rodenbach et al. | 280/150 AB |
| 3,888,504 | 6/1975 | Bonn et al. | 280/150 AB |
| 3,892,425 | 7/1975 | Sakairi et al. | 280/150 AB |
| 3,937,488 | 2/1976 | Wilson et al. | 280/150 AB |
| 4,097,065 | 6/1978 | Okada et al. | 280/739 |
| 4,153,273 | 5/1979 | Risko | 280/740 |
| 4,169,613 | 10/1979 | Barnett | 280/732 |
| 4,302,496 | 11/1981 | Donovan | 428/196 |
| 4,322,385 | 3/1982 | Goetz | 422/165 |
| 4,360,223 | 11/1982 | Kirchoff | 280/729 |
| 4,536,439 | 8/1985 | Forsten | 428/280 |
| 4,954,388 | 9/1990 | Mallouk et al. | 428/422 |

FOREIGN PATENT DOCUMENTS

| | | |
|---|---|---|
| 0227384 | 8/1987 | European Pat. Off. |
| 3644554 | 4/1988 | Fed. Rep. of Germany |
| 2111824 | 7/1983 | United Kingdom |
| 2155853 | 10/1985 | United Kingdom |

Primary Examiner—James J. Bell
Attorney, Agent, or Firm—Gary A. Samuels

[57] ABSTRACT

A vehicle passenger safety device, a laminate for the air bag portion of the device which filters out combustion product particles such as sodium azide, sodium oxide, and sodium hydroxide from the inflating gas escaping into the vehicle, and a process for making the laminate.

10 Claims, 4 Drawing Sheets

AIR BAG LAMINATES

CROSS REFERENCE TO RELATED APPLICATION

This application is a continuation-in-part of application Ser. No. 07/461,193 filed Jan. 5, 1990, which is a continuation-in-part of application Ser. No. 07/367,401 filed June 16, 1989, both abandoned.

FIELD OF THE INVENTION

This invention relates to a laminate for use in passive restraint systems for motor vehicles which rely upon flexible gas containers, often referred to as air bags.

BACKGROUND OF THE INVENTION

Inflatable air bags have consisted of several different designs, such as those made of material impermeable to the inflating gas. These rely on either blow-out patches to begin deflation of the bag or rely on holes of selected size to release the gas. In some versions, the holes may increase in size under gas pressure since the material of the bag is flexible. Other bags are made from a continuously porous material having one or more layers of varying gas permeability which stretch to some extent under gas pressure and thereby increase the gas release capability of the bag on full pressurization and occupant impact stress. Other generally non-porous bags have areas of porosity to release the inflating gas upon full deployment of the bag under gas pressure. Still other bags are elastic textile knit bags coated with a gas-impermeable coating to allow inflation of the bag, the coating of which cracks to become gas pervious when the bag stretches under gas pressure. The following U.S. Pat. Nos. discuss these various styles of bags of differing composition and are hereby incorporated by reference as to background and description: 3,799,574; 3,937,488; 3,807,754; 3,892,425; 3,618,981; 3,888,504; 4,097,065; 4,153,273; 4,169,613; and 4,360,223.

Gases are generated from an ignitable propellant, such as black powder, sodium azide or the like. Generally when ignition of such a propellant takes place gas is released into the bag, as well as burned, unburned and burning particles at the same time. Small size particles escape the air bag through the tiny or large holes built into the bag to allow release of gas for deflation of the bag into the interior of the vehicle, where they may harm the occupant. An azide type gas generator in an air bag floods the passenger compartment of a vehicle with a fine smoke of lung, eye, and generally mucous membrane-irritating particles of sodium oxide/sodium hydroxide and other fine particulate materials. Such gas generators are disclosed in U.S. Pat. Nos. 4,578,247 and 4,590,041, for example. Screen filtering and cooling devices have been utilized within the gas generating devices to try to remove the particles from the gas discharge. Problems of filter clogging and pressure build-up sometimes occur as discussed in U.S. Pat. No. 4,116,466. Problems of restriction of gas flow and reduction of deployment time of the air bag are disclosed in U.S. Pat. No. 4,131,299, where small vehicles require a faster deployment time of the air bag.

Once the gas generator is ignited, both gas and molten particles are released into the bag. The size and the amount of particles is dependent on the type of gas generator used. One standard receptacle for the gas is a Neoprene rubber-coated nylon bag which contains two deflation ports/holes on the side of the bag facing away from the occupant when the bag is inflated and deployed, such as described in U.S. Pat. No. 4,097,065. Such a bag acceptably inflates, then deflates under load (occupant impact on bag) but does not prevent the noxious combustion gases of bag inflation from entering the vehicle and subsequently the lungs of the occupant.

The present invention remedies the noxious particulate problem while maintaining the proper pressure curves of inflation and deflation under load removing or reducing the level of particulates entering the vehicle to a tolerable level.

SUMMARY OF THE INVENTION

This invention comprises laminate materials that can be used in an inflatable vehicle passenger safety restraint air bag that is inflated with gas generated by a pyrotechnic gas generator under pressure and processes for preparing the laminate. The laminate comprises a flame resistant prefilter fabric laminated to a film of porous expanded polytetrafluoroethylene (PTFE) and a strong supportive layer of woven fabric having sufficient hoop strength to support the other two layers under selected gas pressure.

The flame resistant prefilter layer is constructed to filter out larger size particulates resulting from combustion products when the gas forms, and is constructed to be heat resistant. It is preferably a mixed Nomex ®-Kevlar ® aramid spun lace fiber layer which will resist the hot and/or molten materials an act as a prefilter to remove the larger particles from the gas stream. The prefilter lace fibers are preferably coated with a dispersion of particles of fluorinated ethylene-propylene copolymer resin. The prefilter layer is laminated under heat and pressure to the film of porous expanded PTFE and a strong protective layer of fabric, preferably glass fabric polyester fabric, or aramid fabric which supplies resistance to the pressure of gas within the air bag. Fabric is used herein to mean clothlike.

In one embodiment, the sequence of layers is prefilter layer, expanded porous polytetrafluoroethylene layer, and protective layer. In another embodiment, the prefilter layer is between the other two layers.

The lamination process comprises pressing together under heat and pressure on a set of rollers, including a gravure roll for applying dots of thermoplastic adhesive to the PTFE film layer, the three layers of the laminate in such a manner that the thermoplastic adhesive dots are forced under pressure completely through all the layers of the laminate to bond the layers together at specified points. Enough space is left between the dots of adhesive to allow for adequate gas flow through the laminate, but enough dots of adhesive are used for strong bonding of the layers together to prevent delamination under pressure of the gas within the air bag under the normal range of filling pressures. An example of useful material for the adhesive dots is TP3 polyurethane polymer.

DESCRIPTION OF PREFERRED EMBODIMENTS

Figure 1:
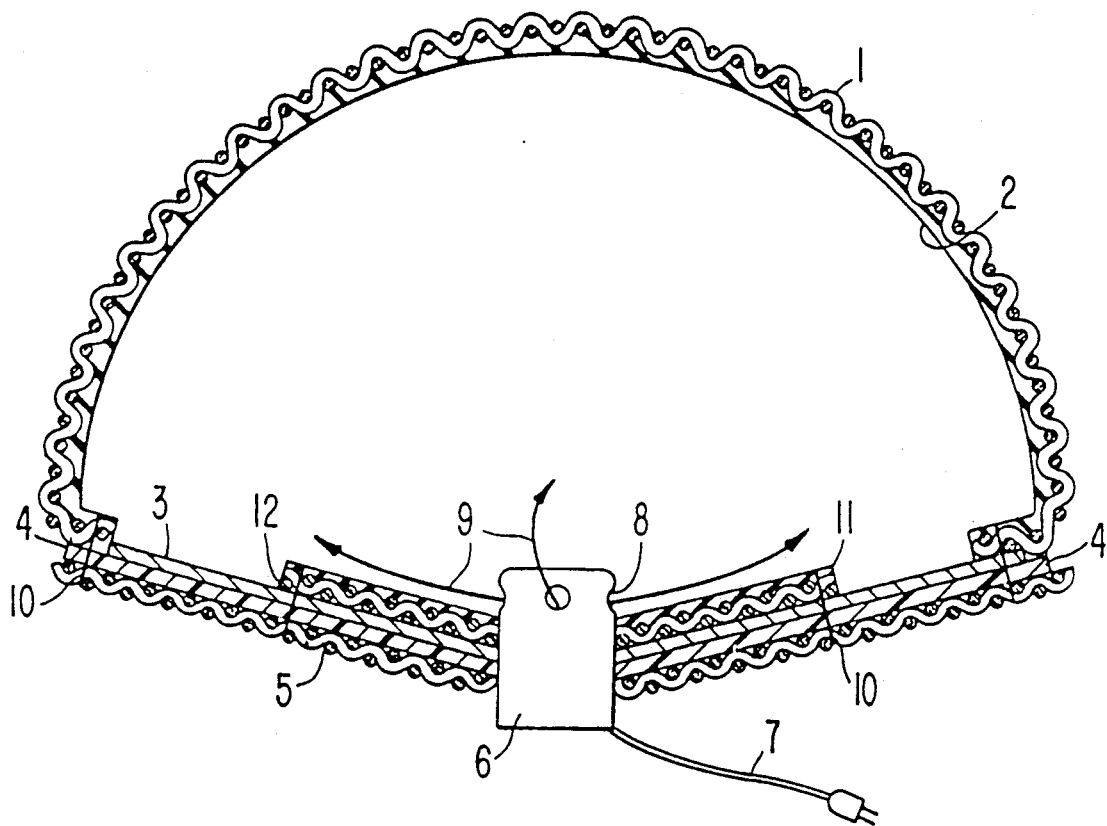
FIG. 1 describes a cross-section of an inflated air bag before completion of gas generation by its pyrotechnic gas generator.

To more clearly describe and define the invention, reference is now made to the figures. FIG. 1 describes in cross-section a fully inflated air bag just before the gas emission from the ignited pyrotechnic gas generator has been completed and the fuel has been expended. The bag comprises an upper, or occupant-facing, layer of gas-impervious heat-resistant laminate, and a lower laminated layer of a flame-resisting flame shield around the area of the gas generator. The issuing gas 9 from apertures 8 in the walls of the gas generator 6 is a very hot mixture of nitrogen gas and sodium oxide containing also molten and/or still-burning particles of sodium azide and sodium oxide. These hot particles impinge on the inner surfaces of the bag, such as the Neoprene coating 2 on the fabric 1 of the upper portion of the bag facing the occupant, and the heat-resistant prefilter layer and flame shield layer 11 of the porous gas-pervious laminated lower layer. The upper layer may conveniently be a Neoprene rubber coating 2 on woven nylon fabric 1. A silicone material may serve as coating 2 as well as other heat-resistant elastomers and plastisols. This layer must be able to withstand the impingement of hot gases and particles from the gas generator for the duration of burning of the gas generator.

The top layer is attached at its edges by a means, such as sewing, to a bottom portion to which is affixed through its wall the opening of the gas outlet of a pyrotechnic gas generator, preferably a sodium azide type of gas generator.

Surrounding the opening of the gas generator is a flame shield to protect the lower layers of the bag from the radially spewed gas flowing from the gas generator from the burning of its solid fuel. The gas contains, besides nitrogen, molten and/or flaming particles of sodium azide fuel, sodium oxide, and sodium hydroxide. The flame shield may be Neoprene rubber-coated nylon woven fabric or a sprayed-on silicone layer or other material that provides adequate protection of a laminate of Nomex aramid fiber woven fabric. The flame shield is attached by, for instance, sewing to a laminated filtering layer and covers a substantial portion of its area.

Figure 2:
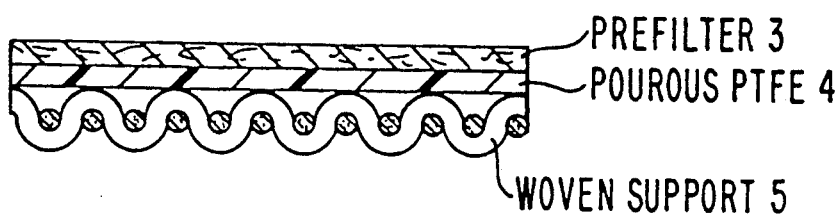
FIG. 2 discloses a cross-section of the laminate of the invention.
Figure 5:
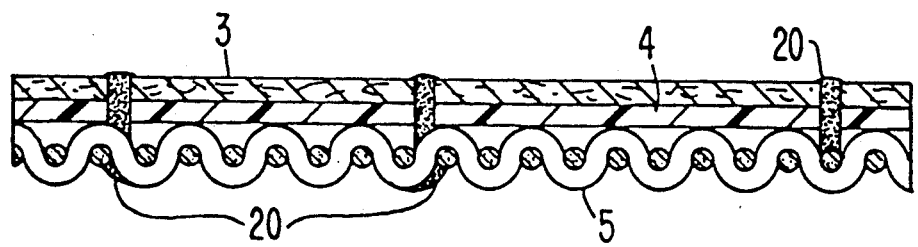
FIG. 5 describes a cross-section of a laminate.

The lower laminated gas transmitting layer in this embodiment, as shown in FIGS. 2 and 5, must have several properties to carry out its proper function. The inner surface layer 3 must also be porous to serve as a prefilter for larger particles carried by the gas stream. Layer 3 must also be heat resistant to not be damaged by the same molten particles and hot gas. A 70% Nomex aramid 30% Kevlar aramid spun lace is a preferred layer 3, but Nomex aramid spun lace, microfiber glass, woven glass fiber, and woven or felted Nomex aramid may also be used. Material strength is not particularly important for this layer. Layer 4 of the laminate is microporous expanded PTFE which filters out the finest (smallest) unburned sodium azide, sodium oxide, and sodium hydroxide (where the oxide encountered water) particles, and other powder residues from the pyrotechnic gas generator. Microporous PTFE is described in and is prepared as shown in U.S. Pat. No. 3,953,566 and U.S. Pat. No. 4,187,390. Layer 4 may be either sintered or unsintered PTFE. Layer 5 provides the hoop strength to the laminate so it can resist the gas pressure inside the gas bag. Woven glass fibers have proved to be strong and economical, but strong woven Kevlar aramid fibers may be used as may other fibers of sufficient strength and heat resistance. They can be sewn into the seam 10 around the edge of the air bag, providing the proper support plus a safety margin for layers 3 and 4 without such bonding, its having lower extensibility per unit load than those layers. Alternatively, layer 5 can be a composite of a woven and a nonwoven fabric. Alternatively, too, in some circumstances the PTFE layer is bonded to the support layer.

The flame shield portion of the lower layer is a Neoprene rubber coated 11 woven nylon fabric layer 12 of similar properties and composition to the upper layer. Silicone or other polymer sprayed on Nomex aramid woven fiber fabric may also be used for the flame shield. The flame shield is usually affixed to the remainder of the lower layer by sewing 10 as shown in FIG. 1. Layer 3 is coated with particles of thermoplastic fluoropolymer, usually from a liquid dispersion of the polymer particles, or PVC or a low melting plastic. The coated layer 3 is heat and pressure bonded by means of the thermoplastic particles to layer 4 of porous expanded PTFE. The bonding particles do not substantially interfere with gas flow through the bonded layers but do cause the layers to adhere sufficiently where hoop strength is not needed during the bag unfolding process when it is inflated. Adjacent to layer 4, but not bonded thereto, is a woven fabric layer 5 usually of glass fibers, polyester fibers 6 or polyamide fibers which have been found to be of the proper strength to support the other layers under the pressure of bag inflation.

Figure 3:
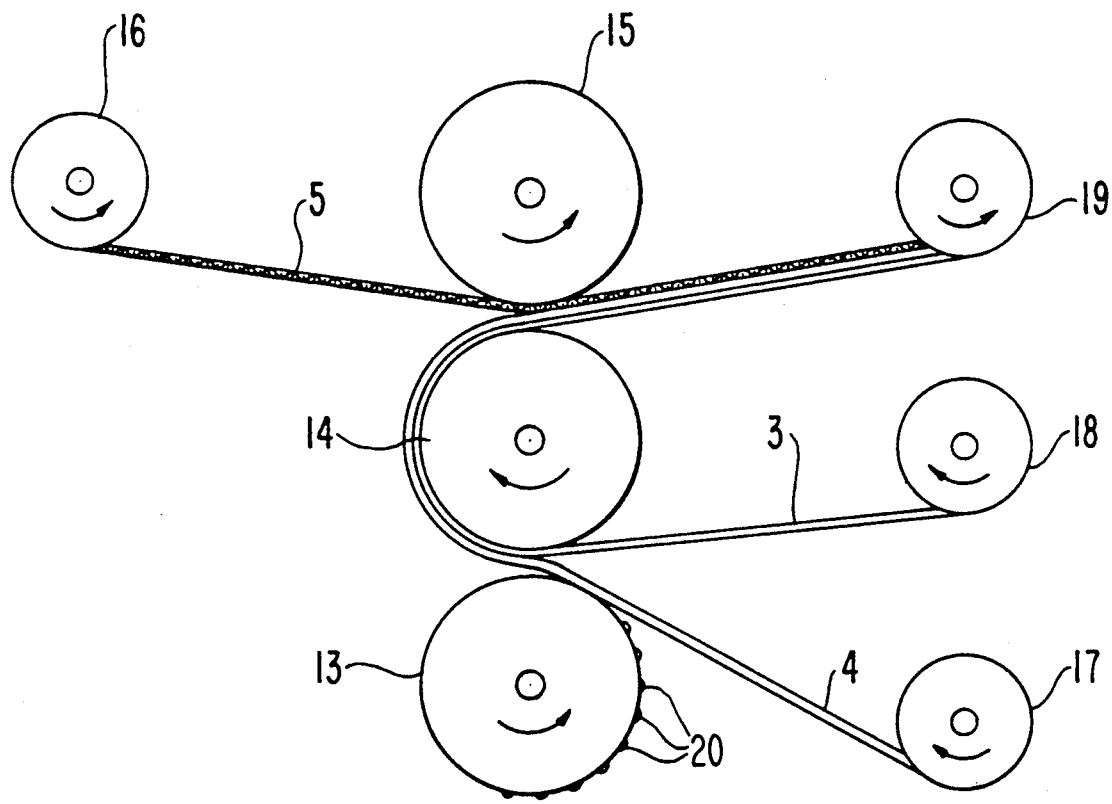
FIG. 3 shows schematically a process for forming a laminate.

A preferred process for laminating the layers so that they can better resist delaminating pressures from within the air bag is described with reference to FIG. 3. Rolls 13, 14, and 15 provide heating and pressure application means which force layers 3, 4, and 5 together to form the bonded laminate. Roll 13 is a gravure roll which applies dots 20 of thermoplastic or solvent-carried adhesive resin, such as thermoplastic polyurethane or other thermoplastic resin or polymer, in a pattern, such as 35 dots per inch for example, to layer 4 before it passes from feed roll 17 between rolls 13 and 14. Layer 3 is also fed from feed roll 18 between rolls 13 and 14 at the same time as layer 4 and is bonded thereto by the dots of thermoplastic adhesive 20 forced through layers 3 and 4 by the pressure and heat of rolls 13 and 14 at the nip between them. The combined layers 3 and 4 pass around roll 14 into the nip between rolls 14 and 15 where layer 5 from feed roll 16 also passes into the nip between rolls 14 and 15 and is bonded to layer 4 by the thermoplastic adhesive forced through layer 4 by the heat and pressure of the nip. The completed laminate is taken up on storage roll 19 after cooling it (cooling process not shown).

Figure 4:
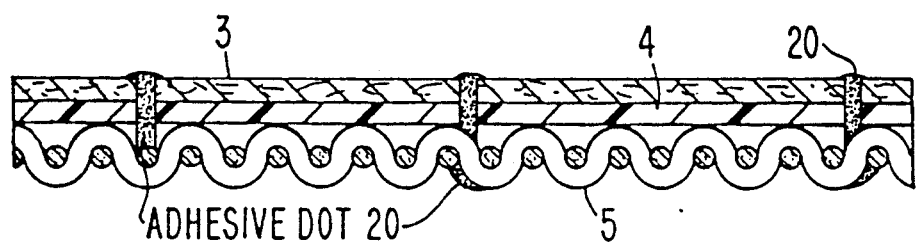
FIG. 4 discloses a cross-section of a laminate.

FIG. 4 describes an alternative laminate to that of FIG. 2, wherein layer 5 may be a fabric made from Kevlar or other aramid fibers woven into a strong fabric, layer 3 may be a spun lace of Kevlar and/or Nomex or other aramid and polyamide heat resistant fibers, and layer 4 is porous expanded PTFE membrane in either sintered or unsintered form. Instead of a pattern of dots 20 of thermoplastic adhesive, a pattern of grid lines or the like of adhesive may be laid down on gravure roll 13 for transfer to layer 4. The fabric layer 5 may comprise the inner layer facing the hot expanding gases and particles from gas generator 6.

FIG. 5 describes a version of the laminate of FIG. 2 wherein the dots 20 of adhesive have been forced through the laminate to bond together all layers of the laminate.

Figure 6:
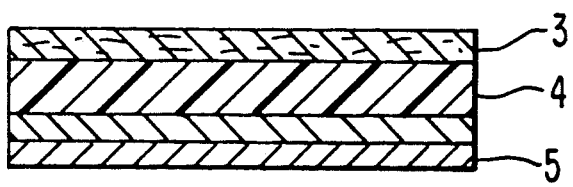
FIG. 6 describes a cross-section of still another laminate.

In FIG. 6, layer 5 is a composite of a nonwoven fabric and a woven fabric with the nonwoven preferably on the side adjacent the PTFE 4. the nonwoven can be any usual nonwoven provided that the composite meets the minimum tensile strength requirements.

EXAMPLE

The fire and heat resistant prefilter layer used was a 2 Nomex/Kevlar spun lace 70/30 2.7 oz./yd.$^2$. This material will remove the larger molten particles while still maintaining its integrity enough to support the expanded microporous PTFE film. Other fire and heat resistant materials could be used here such as plain Nomex, in various forms, fiberglass and microfiberglass in various forms, and other treated felts and fabrics. All of these have different advantages in cost and disadvantages, i.e. degree of heat and fire resistance, shrinkage, flexibility. The next stage of construction is the bonding of the fire and heat resistant prefilter layer to the expanded PTFE film. A PTFE dispersion commercially known as Fluon AD-1 was applied to the surface of the Nomex/Kevlar spun lace layer and then the microporous film laminated to it. Permeability of the laminate can be altered to affect inflation and deflation rates of the bag. This can be accomplished by changing the permeability of the expanded PTFE film, which will also affect the laminates filtration efficiency. Also, the percentage of the bag area covered by the laminate will influence its overall inflation and deflation rates.

An expanded microporous PTFE film manufactured by W. L. Gore & Associates, Inc. with an air permeability 7.0 ft.$^3$ min. at 0.5" H$^2$O was used. This in conjunction with its other layers yielded an overall laminate permeability of 4.5 ft.$^3$/min. at 0.5" H$^2$O.

This particular membrane will filter out 99.993% of 0.1 MM size particles from air.

The adhesive particles referred to earlier could be of almost any type that will allow the laminate to remain flexible and stable over a ten year span and has sufficient heat and fire resistance to withstand temperature fluctuation, such as −30° F. to 240° F. along with temperature experienced during inflation and will make a permeable bond.

The laminate was attached to an outer layer that provides the strength to contain the inner laminate while it is under the pressure produced by the gas generator. Again different materials could be used to act as this outer support layer. The outer layer was a woven polyester of light weight. A woven fiberglass has the distinct advantage of natural heat and fire resistance along with low extensibility but does have some weakness in durability. A nylon 66 fabric could also be used.

Once these layers are placed together they are incorporated into an air bag covering more or less area in order to meet both inflation, deflation and efficiency specifications.

The preferred method was to contain the back half of the bag with the tri-layer (approx. 29" diameter) laminate material and to render the inner 16" diameter of the bag impervious to direct flaming caused by the gas generator. The forward (or passenger facing side) was composed of a neoprene-coated nylon material. These two halves were sewn and sealed to prevent any contaminates from leaking out.

I claim:
1. A laminate comprising, in sequence
   (a) a prefilter layer of heat-resistant material;
   (b) a layer of porous expanded polytetrafluoroethylene; and
   (c) a protective layer of air permeable fabric having a minimum tensile strength of at least 7 kilometers per square cm;
   said laminate having an air permeability of at least 2.12 liters per second at 227 grams water.
2. A laminate of claim 1 wherein the prefilter layer comprises a polyamide, aramid, polyimide, copolymide, polyphenylene sulfide or glass fabric.
3. A laminate of claim 1 wherein the protective layer comprises glass, aramid, polyimide, or polyphenylene sulfide fiber fabric.
4. A laminate comprising, in sequence
   (a) a protective layer of air permeable fabric having a minimum tensile strength of at least seven kilograms per square centimeter;
   (b) a prefilter layer consisting essentially of a heat-resistant material; and
   (c) a layer of porous expanded polytetrafluoroethylene; said laminate having an air permeability of least 2.12 liters per second at 227 grams water.
5. A laminate of claim 4 wherein the prefilter layer comprises a polyamide, aramid, polyimide, copolyimide, polyphenylene sulfide or glass fabric.
6. A laminate of claim 4 wherein the protective layer comprises glass, aramid, polyimide, or polyphenylene sulfide fabric.
7. A laminate comprising, in sequence
   (a) a prefilter layer consisting essentially of a heat-resistant material;
   (b) a protective layer of air permeable fabric having a minimum tensile strength of at least seven kilograms per square centimeter; and
   (c) a layer of porous expanded polytetrafluoroethylene; said laminate having an air permeability of at least 2.12 liters per second at 227 grams water.
8. A laminate of claim 7 wherein the prefilter layer comprises a polyamide, aramid, polyimide, copolyimide, polyphenylene sulfide or glass fabric.
9. A laminate of claim 7 wherein the protective layer comprises glass, aramid, polyimide, or polyphenylene sulfide fiber fabric.
10. An inflatable vehicle passenger safety restraint bag which contains the laminate material of claims 1, 4, or 7.

* * * * *